US012748400B2

(12) United States Patent
Ito

(10) Patent No.: US 12,748,400 B2
(45) Date of Patent: Sep. 29, 2026

(54) INFORMATION PROCESSING DEVICE AND INFORMATION PROCESSING PROGRAM

(71) Applicant: DMG MORI CO., LTD., Nara (JP)

(72) Inventor: Michihiko Ito, Hokkaido (JP)

(73) Assignee: DMG MORI CO., LTD., Nara (JP)

( * ) Notice: Subject to any disclaimer, the term of this patent is extended or adjusted under 35 U.S.C. 154(b) by 369 days.

(21) Appl. No.: 18/281,232

(22) PCT Filed: May 18, 2022

(86) PCT No.: PCT/JP2022/020616
§ 371 (c)(1),
(2) Date: Sep. 8, 2023

(87) PCT Pub. No.: WO2022/259827
PCT Pub. Date: Dec. 15, 2022

(65) Prior Publication Data

US 2024/0152112 A1 May 9, 2024

(30) Foreign Application Priority Data

Jun. 7, 2021 (JP) ................................ 2021-094982

(51) Int. Cl.
*G05B 19/40* (2006.01)
*G05B 19/408* (2006.01)

(52) U.S. Cl.
CPC .................... *G05B 19/4086* (2013.01); *G05B 2219/35051* (2013.01)

(58) Field of Classification Search
CPC .................. G05B 19/4086; G05B 2219/35051
See application file for complete search history.

(56) References Cited

U.S. PATENT DOCUMENTS 8,700,307 B1 * 4/2014 Zhao ...................... B25J 9/1666 701/301
2016/0082545 A1 * 3/2016 Kurokawa ............. B23Q 15/14 700/166
2019/0271965 A1 * 9/2019 Tsuda ................. G05B 19/4093
2023/0305540 A1 * 9/2023 Basmaci ............ G05B 19/4187

FOREIGN PATENT DOCUMENTS

JP 2019-070953 A 5/2019

* cited by examiner

*Primary Examiner* — Christopher W Carter
(74) *Attorney, Agent, or Firm* — IP Business Solutions, LLC

(57) ABSTRACT

An information processing device includes a CL data acquiring unit for acquiring CL data including an instructed position of a tool leading end point and an instructed angle of a tool posture; and an NC program generating unit for calculating a movement position on the linear axis corresponding to the instructed position and a rotational position about the rotation axis corresponding to the instructed angle. The NC program generating unit generates (i) first instructed point data calculated with an initial value of the rotational position and (ii) second instructed point data, which is different from the first instructed point data, calculated with the initial value of the rotational position, and the NC program generating unit counts number of inversions of the rotational position for each of the first instructed point data and the second instructed point data and generates the NC program in which the number of inversions is smaller.

4 Claims, 11 Drawing Sheets

FIG. 4

```
/*/*/TOOL LEADING END POINT CONTROL/*/*/

G43.3 Hn (G43.3: TOOL LEADING END POINT CONTROL START
          INSTRUCTION, n: TOOL NUMBER (TOOL LENGTH)

X1 Y1 Z1 B1 C1

X2 Y2 Z2 B2 C2

 .
 .
 .

Xn-1 Yn-1 Zn-1 Bn-1 Cn-1

Xn Yn Zn Bn Cn

G49 (G49: TOOL LEADING END POINT CONTROL END
     INSTRUCTION)

/*/*/
```

170

FIG. 5

| CAD/CAM DEVICE | | | | | | | POSTPROCESSOR DEVICE | | | | |
|---|---|---|---|---|---|---|---|---|---|---|---|
| CUTTING EDGE POSITION | | | TOOL POSTURE | | | | LINEAR AXIS POSITION | | | ROTATION AXIS POSITION | |
| X | Y | Z | I | J | K | | X | Y | Z | B | C |
| · | · | · | · | · | · | | · | · | · | · | · |
| 4.539 | 8.910 | -0.221 | -0.105 | 0.290 | 0.951 | → | 4.539 | 8.910 | -0.221 | -18.0 | -70.0 |
| 4.474 | 10.049 | -0.221 | -0.139 | 0.312 | 0.939 | → | 4.474 | 10.049 | -0.221 | -20.0 | -66.0 |
| 4.300 | 11.202 | -0.221 | -0.175 | 0.330 | 0.971 | → | 4.300 | 11.202 | -0.221 | -22.0 | -62.0 |
| 4.017 | 12.363 | -0.221 | -0.215 | 0.344 | 0.913 | → | 4.017 | 12.363 | -0.221 | -24.0 | -58.0 |
| 3.623 | 13.522 | -0.221 | -0.257 | 0.354 | 0.898 | → | 3.623 | 13.522 | -0.221 | 26.0 | 126.0 |
| · | · | · | · | · | · | | · | · | · | · | · |
| · | · | · | · | · | · | | · | · | · | · | · |

FIG. 7A

| CAM DEVICE | | | | INFORMATION PROCESSING DEVICE (POSTPROCESSOR) | | |
|---|---|---|---|---|---|---|
| TOOL POSTURE | | | | ROTATION AXIS POSITION | | ROTATION AXIS INVERSION |
| I | J | K | | B | C | |
| · | · | · | | · | · | |
| -0.105 | 0.290 | 0.951 | → | 18.0 | 110.0 | |
| -0.139 | 0.312 | 0.939 | → | 20.0 | 114.0 | |
| -0.175 | 0.330 | 0.971 | → | 22.0 | 118.0 | |
| -0.215 | 0.344 | 0.913 | → | 24.0 | 122.0 | |
| -0.257 | 0.354 | 0.898 | → | 26.0 | 126.0 | |
| · | · | · | | · | · | |
| · | · | · | | · | · | |

FIG. 7B

| CAM DEVICE | | | | INFORMATION PROCESSING DEVICE (POSTPROCESSOR) | | |
|---|---|---|---|---|---|---|
| TOOL POSTURE | | | | ROTATION AXIS POSITION | | ROTATION AXIS INVERSION |
| I | J | K | | B | C | |
| · | · | · | | · | · | |
| -0.105 | 0.290 | 0.951 | → | -18.0 | -70.0 | |
| -0.139 | 0.312 | 0.939 | → | -20.0 | -66.0 | |
| -0.175 | 0.330 | 0.971 | → | -22.0 | -62.0 | |
| -0.215 | 0.344 | 0.913 | → | -24.0 | -58.0 | |
| -0.257 | 0.354 | 0.898 | → | 26.0 | 126.0 | INVERTED |
| · | · | · | | · | · | |
| · | · | · | | · | · | |

INFORMATION PROCESSING DEVICE AND INFORMATION PROCESSING PROGRAM

TECHNICAL FIELD

The present invention relates to an information processing device that generates an NC (Numerical Control) program used in a machine tool.

BACKGROUND ART

For example, a five-axis working machine having three linear axes (an X-axis, a Y-axis, and a Z-axis) orthogonal to each other and two rotation axes (a B-axis and a C-axis) is known as a machine tool. Rotation on the B-axis tilts a spindle and rotation on the C-axis rotates a workpiece. Such a machine tool machines a workpiece into a desired shape while a numerical controller executes an NC program (a machining program) to control the five axes and change the leading end point positions and the posture of a tool.

Specifically, as illustrated in FIG. 11, control of a tool leading end point is executed in accordance with a machining path (Px, Py, Pz) and a tool posture (α, β) instructed by the NC program (see Patent Literature 1). The machining path (Px, Py, Pz) indicates positions of the leading end point of the tool on the three linear axes. The tool posture (α, β) indicates rotation angles of the two rotation axes.

The NC program is generated based on cutter location data (hereinafter, referred to as "CL data") obtained through a computer-aided design (CAD) and a computer-aided manufacturing (CAM). However, there are many types of machine tools and specifications differ according to manufacturers of the machine tools. Therefore, the CL data is appropriately converted by a postprocessor of the CAM and an NC program optimized for each of the machine tools is provided.

That is, the CAM generates CL data including the tool path and the tool posture on the basis of CAD data. The postprocessor calculates rotational positions about the rotation axes (hereinafter, also referred to as "positions about the rotation axes") for realizing the tool posture, and generates the NC program.

CITATION LIST

Patent Literature

PTL 1: JP 2019-70953 A

SUMMARY OF INVENTION

Technical Problem

The postprocessor sequentially calculates the positions about the rotation axes based on the tool posture and two solutions are obtained at that time.

That is, for example, in a case of a machine tool having two rotation axes of a B-axis and a C-axis on the side of a table, the relation between the tool posture (I, J, K) and the positions about the rotation axes (B, C) is represented by a following formula (1),

[Math.1]

$$\begin{pmatrix} I \\ J \\ K \end{pmatrix} = \begin{pmatrix} -\sin(B)\cos(C) \\ \sin(B)\sin(C) \\ \cos(B) \end{pmatrix} \quad (1)$$

where (I, J, K) denotes a directional vector of a cutting edge (a leading end point) of a tool (more precisely, a directional vector from the cutting edge of the tool to the base end). "B" denotes a rotation angle from a reference position on the B-axis (a first rotation axis) and "C" denotes a rotation angle from a reference position on the C-axis (a second rotation axis).

The rotation angle of the B-axis is represented bye a following formula (2).

[Math. 2]

$$B = \cos^{-1}(K) \quad (2)$$

Therefore, when K=±1, B has a singular solution and C cannot be uniquely obtained. On the other hand, when K≠1, there are two solutions in a range of $-\pi < B \leq \pi$. Therefore, C is calculated for each B.

When C is solved for I and J in the above formula (1), a following formula (3) is obtained.

[Math.3]

$$C = a\tan\left(\frac{-I}{J}\right) \quad (3)$$

Accordingly, the postprocessor needs to determine one of two sets of solutions as a combination of the rotation angles of the B-axis and the C-axis. A solution that causes the rotational position about the B-axis (an inclined axis) to be positive with respect to the reference position, or a solution that causes the amount of movement on the rotation axis to be smaller is generally selected. However, the motion range of the rotation axis is restricted by specifications of the machine tool and a favorable solution cannot be selected in some cases. In these cases, the rotation axis greatly moves in the course of actual machining of the machine tool, which may lead to increase in the machining time or deterioration in the machined surface quality.

Solution to Problem

An embodiment of the present invention provides an information processing device that generates an NC program to be used in a machine tool having a linear axis and a rotation axis. The information processing device includes a CL data acquiring unit for acquiring CL data including an instructed position of a tool leading end point and an instructed angle of a tool posture, and an NC program generating unit for calculating a movement position on the linear axis corresponding to the instructed position and a rotational position about the rotation axis corresponding to the instructed angle on the basis of the acquired CL data to generate the NC program. The NC program generating unit generates (i) first instructed point data calculated with an initial value of the rotational position and (ii) second instructed point data, which is different from the first instructed point data, calculated with the initial value of the rotational position, counts the number of inversions of the rotational position for each of the first instructed point data and the second instructed point data and generates the NC program in which the number of inversions is smaller.

Another embodiment of the present invention provides an information processing program for generating an NC program to be used in a machine tool having a linear axis and a rotation axis. The information processing program causes a computer to implement a function of acquiring CL data including an instructed position on a tool leading end point and an instructed angle of a tool posture, and a function of generating the NC program by calculating a movement position on the linear axis corresponding to the instructed position and a rotational position about the rotation axis corresponding to the instructed angle on a basis of the acquired CL data. The function of generating the NC program includes generating (i) first instructed point data calculated with an initial value of the rotational position and (ii) second instructed point data, which is different from the first instructed point data, calculated with the initial value of the rotational position, and counting the number of inversions of the rotational position for each of the first instructed point data and the second instructed point data and generating the NC program in which the number of inversions is smaller.

The information processing device and the information processing program can generate two different NC programs for machining of one workpiece. The two NC programs are different from each other in the number of inversions therein.

The information processing device and the information processing program can then autonomously select and generate one of the two NC programs in which the number of inversions is smaller than the other.

Advantageous Effects of Invention

According to the present invention, an NC program that can suppress increase in the machining time or deterioration in the machined surface quality resulting from the situation described above in a machine tool can be generated.

BRIEF DESCRIPTION OF DRAWINGS

FIG. 4 is a diagram illustrating an example of an NC program.

FIG. 5 is a diagram illustrating a method of conversion from CL data to an NC program.

FIG. 7A is a diagram illustrating a generation method of instructed point data.

FIG. 7B is a diagram illustrating a generation method of instructed point data.

DESCRIPTION OF EMBODIMENTS

An embodiment of the present invention is explained below with reference to the drawings.

Figure 1:
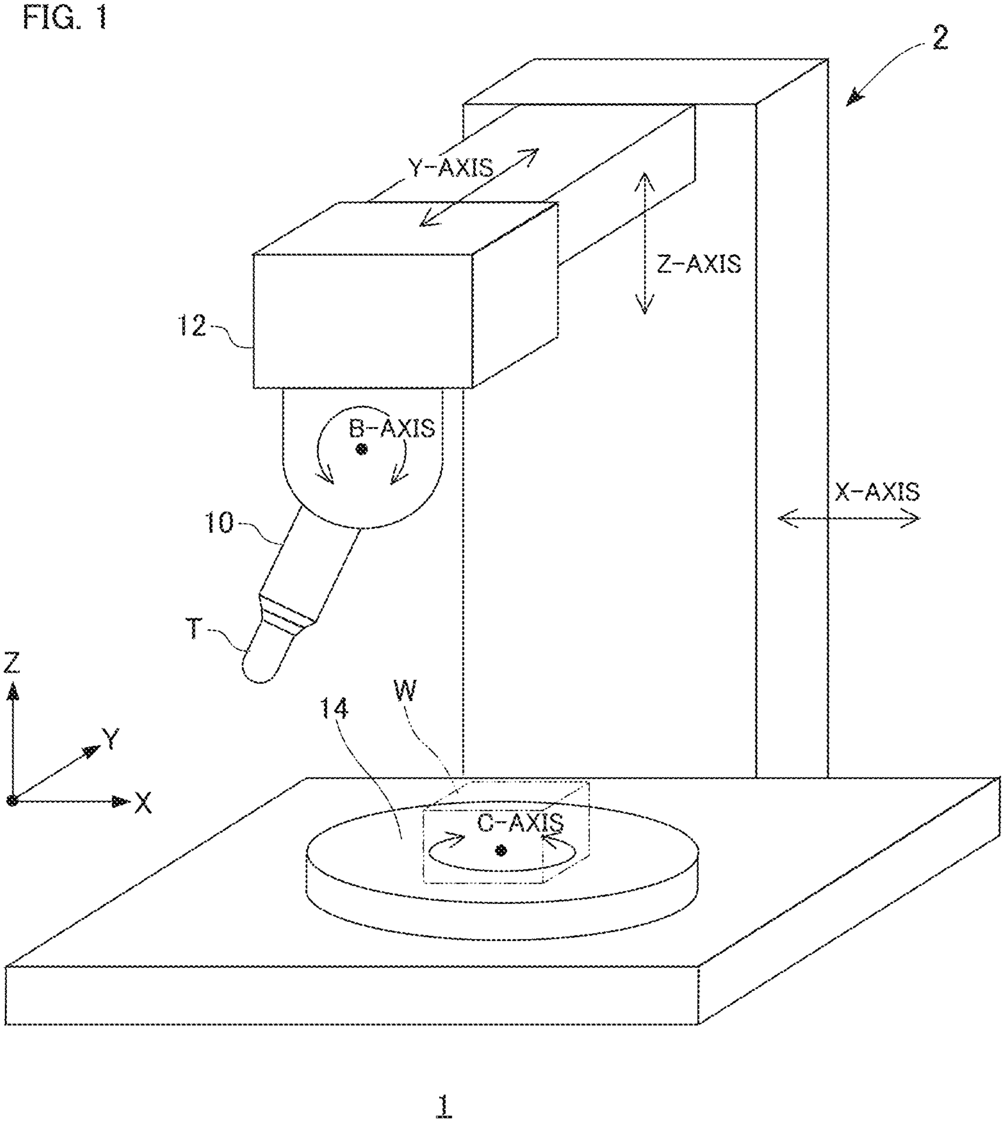
FIG. 1 is a schematic diagram illustrating a general configuration of a machine tool according to an embodiment.

FIG. 1 is a schematic diagram illustrating a general configuration of a machine tool according to the embodiment. In this figure, a right-left direction, a front-back direction, and an upper-lower direction of a machine tool I seen from the front are an X-axis direction, a Y-axis direction, and a Z-axis direction, respectively.

The machine tool 1 is a five-axis control machining center and includes machining equipment 2 that has three linear axes (an X-axis, a Y-axis, and a Z-axis) orthogonal to each other, and two rotation axes (a B-axis and a C-axis). The B-axis functions as a "first rotation axis" and the C-axis functions as a "second rotation axis". Various types of machining are performed while these five axes are simultaneously controlled by a numerical controller described later to move the tool leading end point and change the tool posture, The machining equipment 2 includes a spindle head 12 that supports a spindle 10, and a table 14 that supports a workpiece W. The spindle head 12 has the B-axis and supports the spindle 10 to be rotatable (tillable) around the B-axis. The spindle 10 coaxially supports a tool T. The tool T is, for example, an end mill. The spindle head 12 is provided with a spindle motor for rotationally driving the spindle 10 around the axis line and a servo motor for pivoting the spindle 10 on the B-axis. Since the tilt angle of the tool T with respect to the Z-axis direction changes due to pivoting of the spindle, the B-axis also functions as a "pivot axis" being an axis of tilt.

The tilt angle of the tool T with respect to the workpiece W changes due to pivoting of the spindle 10. The spindle head 12 is also driven in three axial directions by a plurality of servo motors, respectively. The spindle 10 is movable in the X-axis, Y-axis, and Z-axis directions due to driving of the spindle head 12.

The workpiece W is fixed to the table 14 with a jig (not illustrated). The C-axis is provided along the axis line of the table 14. The table 14 is rotationally driven around the C-axis by a servo motor (not illustrated). That is, with the configuration described above, relative positions of the workpiece W and the tool T can be three-dimensionally adjusted.

Figure 2:
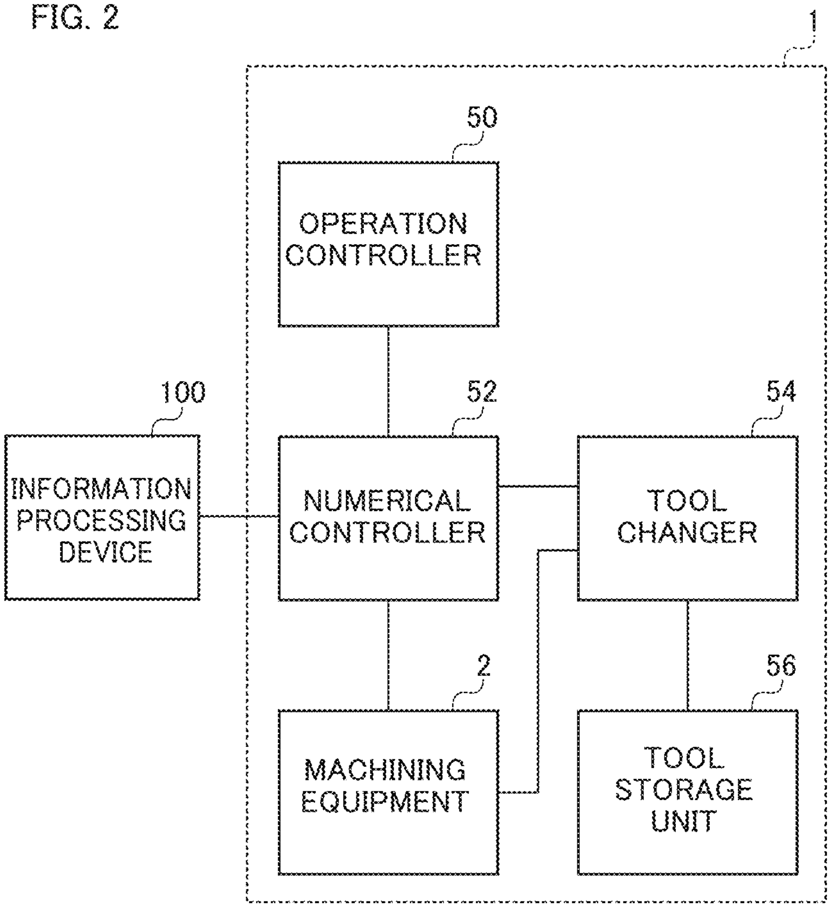
FIG. 2 is a hardware configuration diagram of the machine tool.

FIG. 2 is a hardware configuration diagram of the machine tool 1.

The machine tool 1 includes an operation controller 50, a numerical controller 52, the machining equipment 2, a tool changer 54, and a tool storage unit 56. The numerical controller 52 transmits control signals to the machining equipment 2 in accordance with an NC program manually or automatically generated. The machining equipment 2 drives the spindle 10 and the table 14 to machine the workpiece W in accordance with instructions from the numerical controller 52.

The operation controller 50 includes an operation panel that provides a user interface function to an operator. The operator controls the numerical controller 52 via the operation controller 50. The tool storage unit 56 has tools stored therein. The tool changer 54 corresponds to a so-called ATC (Automatic Tool Changer). The tool changer 54 takes out a tool from the tool storage unit 56 and replaces the tool held on the spindle 10 with the tool taken out in accordance with a replacement instruction from the numerical controller 52.

An information processing device 100 is connected to the numerical controller 52. The information processing device 100 generates an NC program on the basis of CL data acquired from a CAM device (not illustrated) and outputs the NC program to the numerical controller 52. The numerical controller 52 executes the NC program to control the machining equipment 2. The information processing device 100 may be configured as a part of the operation controller 50. The information processing device 100 may be a general laptop PC (Personal Computer) or a tablet computer.

Figure 3:
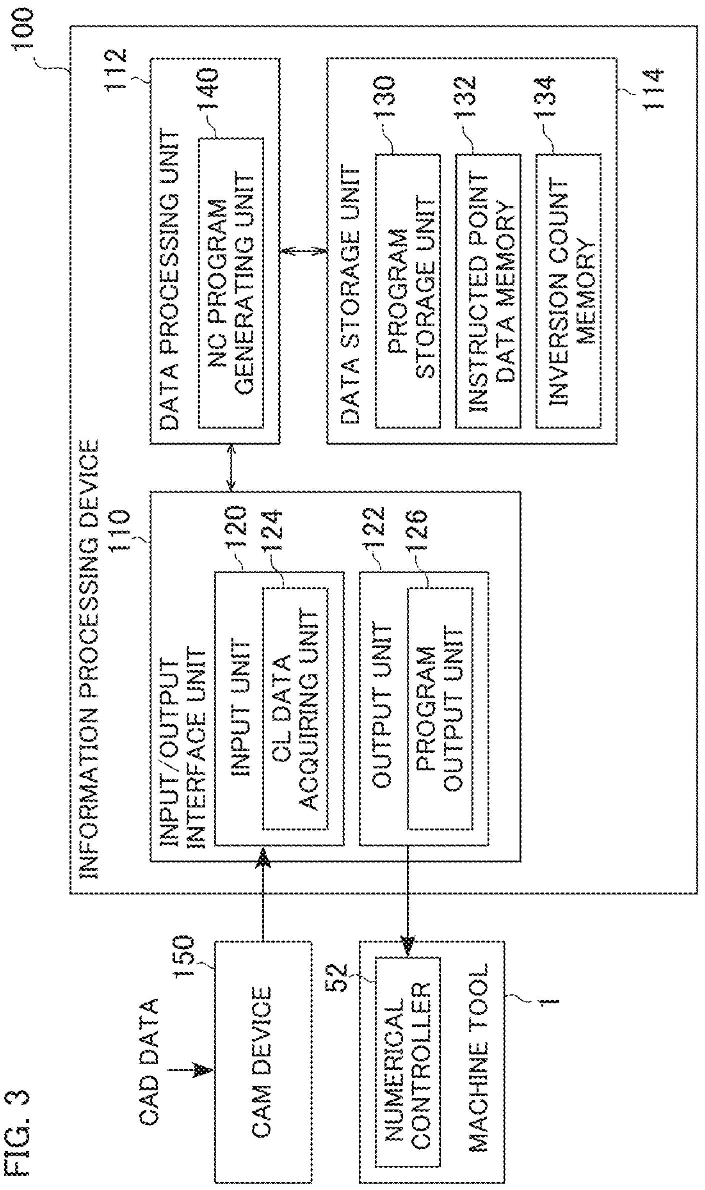
FIG. 3 is a functional block diagram of an information processing device.

FIG. 3 is a functional block diagram of the information processing device 100.

The components of the information processing device 100 are implemented by hardware including computing units such as CPUs (Central Processing Unit) and various computer processors, storage devices such as memories and storages, and wired or wireless communication lines that connect these units and devices, and software that is stored in the storage devices and supplies processing instructions to the computing units. Computer programs may be constituted by device drivers, operating systems, various application programs on upper layers thereof, and a library that provides common functions to these programs. Blocks that are described below do not refer to configurations in units of hardware but to blocks in units of functions.

Note that the operation controller 50 and the numerical controller 52 may also be implemented by hardware including computing units such as processors, storage devices such as memories and storages, and wired or wireless communication lines that connect these units and devices, and software and programs that are stored in the storage devices and supply processing instructions to the computing units, which are executed on operating systems separate from the information processing device 100.

The information processing device 100 includes an input/output interface unit 110, a data processing unit 112, and a data storage unit 114. The input/output interface unit 110 performs processes relating to input/output interfaces, including transmission and reception of data to/from external devices. The data processing unit 112 performs various processes on the basis of data obtained by the input/output interface unit 110 and data stored in the data storage unit 114. The data processing unit 112 also functions as interfaces of the input/output interface unit 110 and the data storage unit 114. The data storage unit 114 has various programs and set data stored therein. The input/output interface unit 110 includes an input unit 120 and an output unit 122.

The input unit 120 includes a CL data acquiring unit 124. The CL data acquiring unit 124 acquires CL data from a CAM device 150. The CAM device 150 acquires CAD data generated by a CAD device (not illustrated) and acquires path generation information (a coordinate system, a tool shape, a feeding speed, a spindle rotation speed, and the like). The CAM device 150 generates CL data on the basis of the CAD data and the path generation information. The CL data includes an instructed position of the tool leading end point and an instructed angle of the tool posture (details thereof will be described later). The CAM device 150 outputs the generated CL data to the information processing device 100.

The data storage unit 114 includes a program storage unit 130, an instructed point data memory 132, and an inversion count memory 134. The data storage unit 114 includes a memory that functions as a working area in a case in which the data processing unit 112 performs a computing process.

The program storage unit 130 has stored therein an information processing program for generating NC programs. The instructed point data memory 132 temporarily stores therein instructed point data calculated in the course of generation of an NC program. The inversion count memory 134 temporarily stores therein the number of inversions of the position about the rotation axis updated in the course of generation of an NC program (details thereof will be described later).

The data processing unit 112 includes an NC program generating unit 140. The NC program generating unit 140 functions as a postprocessor and generates an NC program on the basis of the CL data acquired from the CAM device 150 (details thereof will be described later).

The output unit 122 includes a program output unit 126. The program output unit 126 outputs the generated NC program to the numerical controller 52.

A generation method of an NC program is explained next.

FIG. 4 is a diagram illustrating an example of the NC program.

An NC program 170 is composed of a plurality of blocks and a G code (G43.3) instructing tool length correction (corresponding to start of tool leading end point control), a G code (G49) instructing an instructed position of the tool leading end point and an instructed angle of the tool posture, and cancellation of the tool length correction (corresponding to end of the tool leading end point control), and the like are respectively described in the blocks. The instructed position of the tool leading end point is indicated by position coordinates (Xn, Yn, Zn) of the tool leading end point in a workpiece coordinate system, and the instructed angle of the tool posture is indicated by movement angles (Bn, Cn) of the rotation axes (the B-axis and the C-axis).

In the present embodiment, the postprocessor is used to generate an NC program according to the specifications of the machine tool 1. A general method relating to conversion from CL data to an NC program, and problems associated with the conversion are first outlined as a presupposition.

Figure 6:
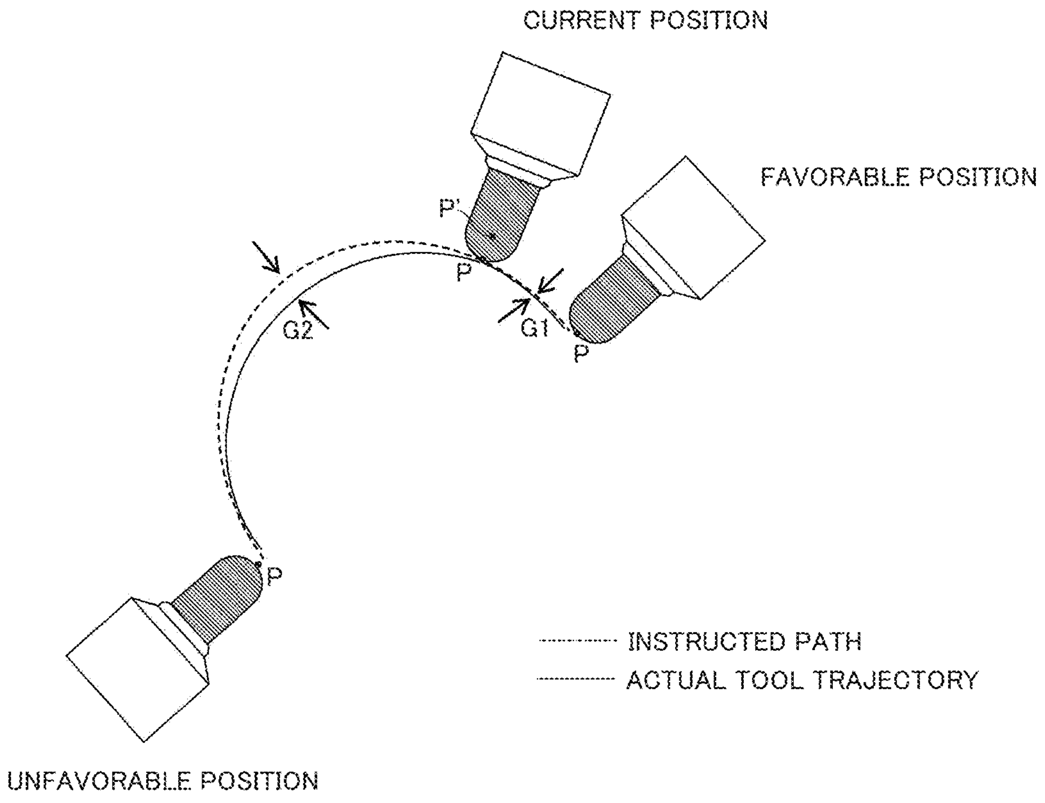
FIG. 6 is a diagram schematically illustrating problems associated with conversion to the NC program.

FIG. 5 is a diagram illustrating a method of conversion from CL data to an NC program. FIG. 6 is a diagram schematically illustrating problems associated with the conversion to an NC program.

As illustrated in FIG. 5, the CAM device generates CL data on the basis of CAD data, and outputs the CL data to the postprocessor. The CL data includes the instructed position (a cutting edge position) of the tool leading end point and the tool posture. The CL data includes a plurality of blocks of combinations of the instructed position and the instructed angle along a machining path. The instructed position (X, Y, Z) indicates coordinates of a destination of the tool leading end point, and the tool posture (I, J, K) indicates a directional vector of the cutting edge (the leading end point) of the tool.

The postprocessor generates instructed point data constituting an NC program from the CL data transmitted from the CAM device. The instructed point data include positions on the linear axes (X, Y, Z) and positions about the rotation axes (B, C). The "positions on the linear axes" are movement positions on the linear axes and correspond to the instructed position (X, Y, Z) of the tool leading end point. Meanwhile, the "positions about the rotation axes" are rotational positions (movement angles) about the rotation axes (the B-axis and the C-axis) corresponding to the tool posture (I, J, K). In the present embodiment, the Z-axis negative direction corresponds to a reference position with respect to the B-axis, that is, 0 degrees with respect to the B-axis.

As already explained, there are two solutions for each of positions about the rotation axes, Each of the generated instructed point data corresponds to a block of the CL data, in other words, the instructed point data for a plurality of blocks of CL data are generated, in which each of the instructed point data corresponds to a block of the CL data. In this process, in some cases, two rotational positions about each rotation axis in instructed point data corresponding to one block can be obtained by calculating a pre-. determined formula. In the illustrated example, the initial values of the positions about the rotation axes are set to a negative side relative to the reference values. However, the signs are inverted at some point since the motion range (the rotation angle range) of the B-axis is restricted due to the specifications of the machine tool. In this example, the specifications (the mechanical configuration) prevent the B-axis from moving more than −25.0 degrees on the negative side, That is, although one solution (−26.0, −54.0) is to be selected as the positions about the rotation axes (the B-axis, the C-axis) in instructed point data of an illustrated fifth block without this restriction in the specifications, the other solution (26.0, 126.0) is forced to be selected (see a dotted line region).

More specifically, as illustrated in FIG. 6, although it is ideal to move the tool T from the current position (corresponding to a fourth block in FIG. 5) to a first position (a favorable position that corresponds to one solution) near the current position, the tool T is forced to be moved to a second position (an unfavorable position that corresponds to the other solution) greatly distant from the current position. As the destination is farther from the current position, an error between the instructed path (see a broken line) of the CL data and an actual trajectory (see a solid line) of the tool leading end point P is larger (G2>G1) due to the following capability issue of the axis movement of the machine tool, which leads to deterioration in the machined surface quality. Furthermore, the machining time is increased as the movement distance is larger.

Although the cutting edge of the tool T is set as the tool leading end point P being the target for position control as illustrated in the present embodiment, a leading end center P' may be set as the tool leading end point in a modification.

A generation method of an NC program in the present embodiment is explained next.

As the frequency of movement to an unfavorable position as described above is higher, problems such as deterioration in the machined surface quality are more likely to occur. Therefore, in the present embodiment, occurrence of the above problems is suppressed by reducing the number of inversions of the signs of the positions about the rotation axis in the instructed point data in a manner as described below.

FIGS. 7A and 7B are diagrams illustrating a generation method of instructed point data. FIG. 7A illustrates instructed point data in a case in which the initial values of the positions about the rotation axes are positive values with respect to the reference position. On the other hand, FIG. 7B illustrates instructed point data in a case in which the initial values of the positions about the rotation axes are negative values with respect to the reference position.

The NC program generating unit 140 executes the information processing program for generating an NC program and sequentially calculates instructed point data corresponding to the CL data. Since two solutions are calculated as the instructed point data as described above, instructed point data calculated with the initial values of the positions about the rotation axes at positive values (corresponding to a "first value") with respect to the reference position is referred to as "first instructed point data" (FIG. 7A). Instructed point data calculated with the initial values of the positions about the rotation axes at negative values (corresponding to a "second value") with respect to the reference position is referred to as "second instructed point data" (FIG. 7B).

The NC program generating unit 140 counts the number of inversions of the signs of the positions about the rotation axes in execution of all blocks for each of the first instructed point data and the second instructed point data, and generates an NC program including the first or second instructed point data having a smaller number of sign inversions. In the illustrated example, there is no sign inversions in the first instructed point data, and sign inversion occurs in the second instructed point data. Therefore, the NC program generating unit 140 generates an NC program including the first instructed point data.

With this selection of instructed point data in which the number of sign inversions of the positions about the rotation axes is smaller, the frequency of movement of the tool T to a favorable position can be relatively increased when the NC program is executed (see FIG. 6). Accordingly, deterioration in the machined surface quality can be suppressed and the machining efficiency can also be kept high.

An NC program generation process is specifically explained next.

Figure 8:
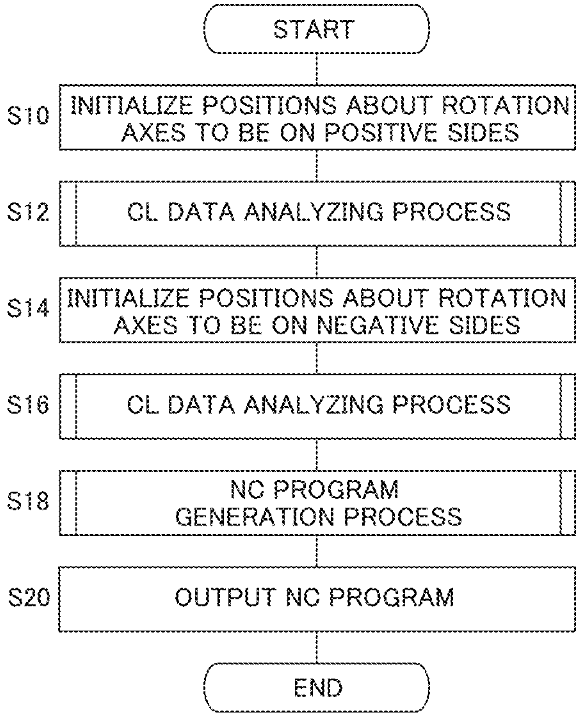
FIG. 8 is a flowchart illustrating an NC program generation process.

FIG. 8 is a flowchart illustrating an NC program generation process.

The NC program generating unit 140 first performs setting to select positive values with respect to the reference value as the initial values of the positions about the rotation axes calculated based on the CL data (S10). Next, the CL data acquiring unit. 124 starts, acquiring the CL data and the NC program generating unit 140 performs a CL data analyzing process (S12).

Figure 9:
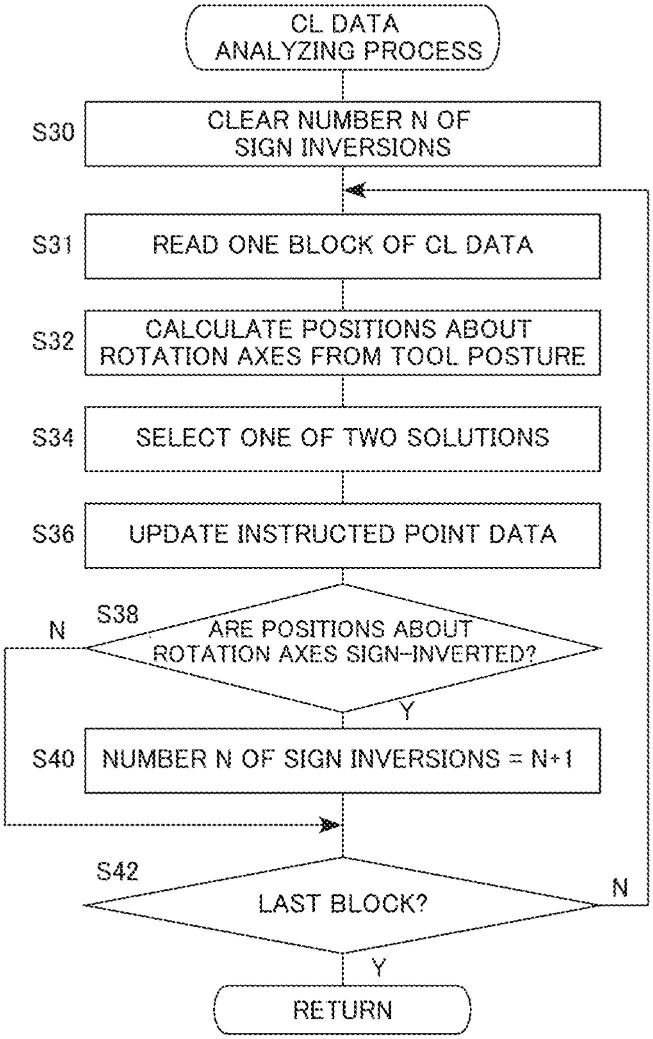
FIG. 9 is a flowchart illustrating a CL data analyzing process at S12 in FIG. 8.

FIG. 9 is a flowchart illustrating the CL data analyzing process at S12 in FIG. 8.

The NC program generating unit 140 clears the number N of sign inversions relating to the instructed point data to zero before analyzing the CL data (S30).

The CL data acquiring unit 124 first reads one block of the CL data from the CAM device 150 (S31). The NC program generating unit 140 calculates the positions about the rotation axes (B, C) from the tool posture (I, J, K) included in the CL data (S32). The NC program generating unit 140 selects one of two solutions calculated this time (S34) and calculates instructed point data so as to include the selected solution as the positions about the rotation axes.

In the present embodiment, the solution selecting condition at this time is set in advance to basically select a solution where the amount of movement on the B-axis is smaller. However, when this selection cannot be performed due to the specifications of the machine tool 1, the other solution is selected. The instructed point data memory 132 is updated with this instructed point data (the first instructed point data) to be associated with the block number (S36).

When a solution that inverts the signs of the positions about the rotation axes is selected at this time on the basis of the specifications of the machine tool 1 (Y in S38), the number N of sign inversions of the instructed point data (a number N1 of sign inversions in the first instructed point data) in the inversion count memory 134 is incremented by one (S40). When the signs of the positions about the rotation axes are not inverted (N in S38), the process at S40 is skipped. The processes described above are repeated until the instructed point data of the last block in the CL data is calculated (N in S42). When the process for the last block ends (Y in S42), the present processing is once ended.

Referring back to FIG. 8, the NC program generating unit 140 subsequently performs setting to select negative values with respect to the reference value as the initial values of the positions about the rotation axis calculated based on the CL data (S14). Next, the CL data acquiring unit 124 starts acquiring the CL data again, and the NC program generating unit 140 performs a CL data analyzing process (S16). Accordingly, the second instructed point data is generated and the number N of sign inversions thereof (a number N2 of sign inversions in the second instructed point data) is updated, Since this CL data analyzing process is identical to the process at S12 (see FIG. 9) except that the initial values of the positions about the rotation axis are different, explanations thereof are omitted. The NC program generating unit 140 performs the NC program generation process on the basis of results of the CL data analyzing processes (S12 and S16) described above (S18).

Figure 10:
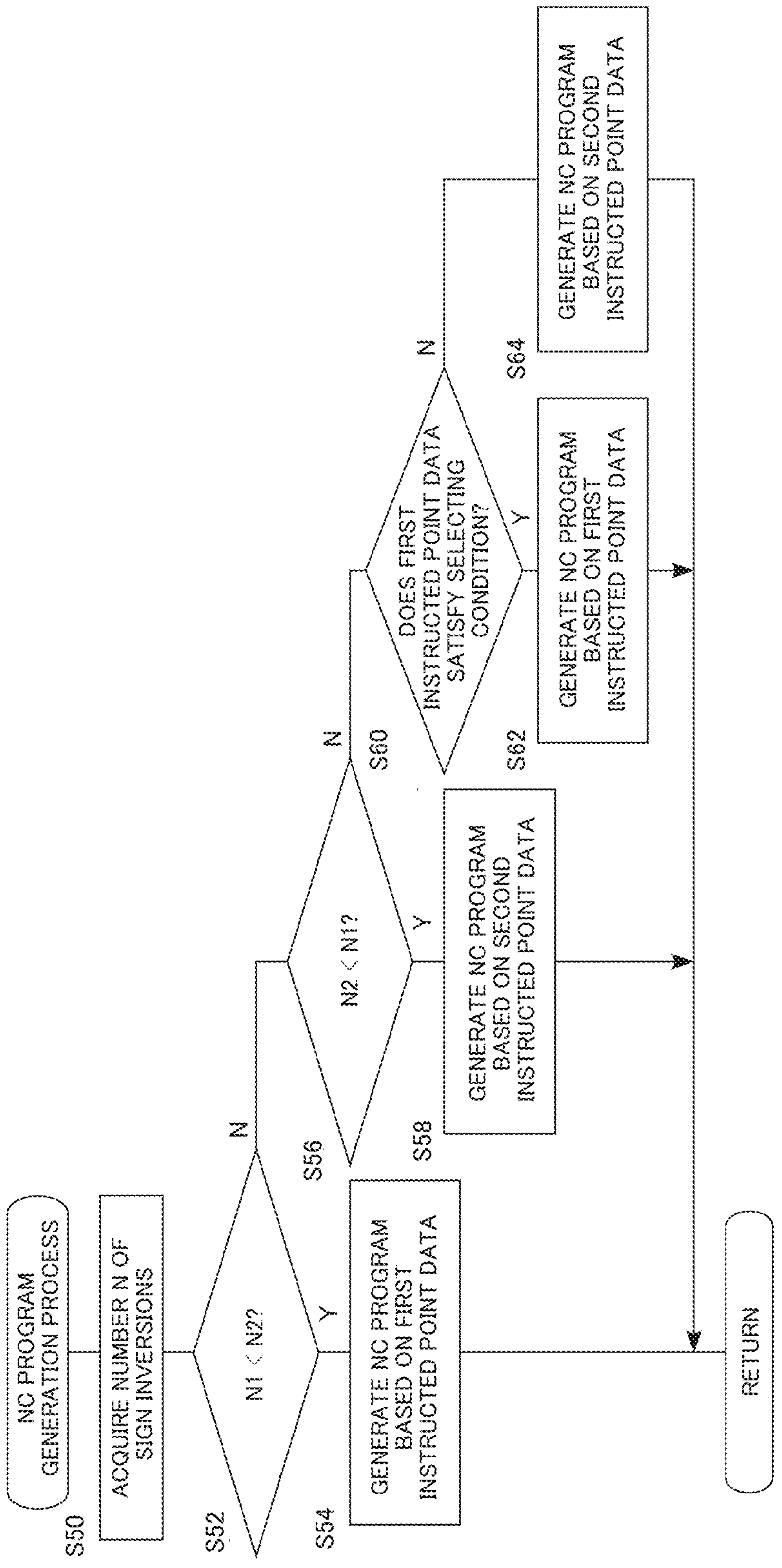
FIG. 10 is a flowchart illustrating an NC program generation process at S18 in FIG. 8.
Figure 11:
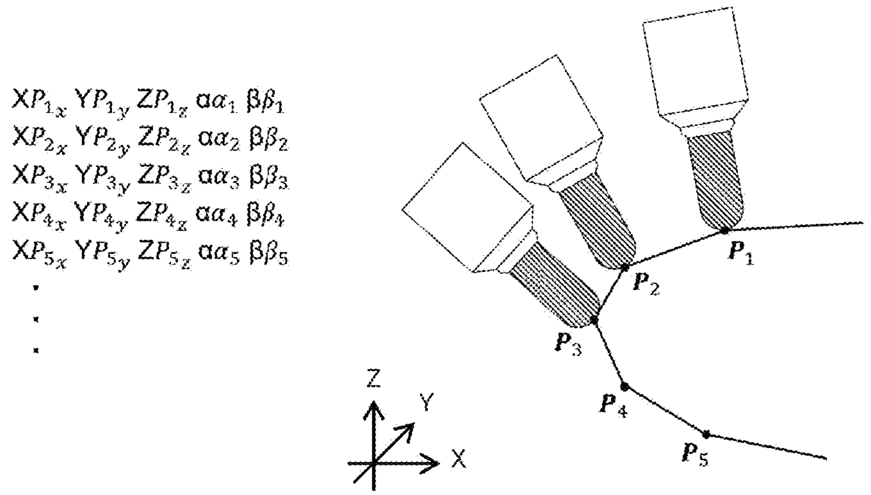
FIG. 11 is a diagram illustrating a summary of tool leading end point control.

FIG. 10 is a flowchart illustrating the NC program generation process at S18 in FIG. 8.

The NC program generating unit 140 reads the number N1 of sign inversions in the. first instructed point data and the number N2 of sign inversions in the second instructed point data from the inversion count memory 134 and compares these numbers with each other. At this time, when the number N1 of sign inversions is smaller than the number N2 of sign inversions (Y in S52), the NC program generating unit 140 generates an NC program so as to include the first instructed point data where the initial values of the positions about the rotation axis are positive values with respect to the reference value (S54).

On the other hand, when the number N2 of sign inversions is smaller than the number N1 of sign inversions (N in S52 and Y in S56), the NC program generating unit 140 generates an NC program so as to include the second instructed point data where the initial values of the positions about the rotation axis are negative values with respect to the reference value (S58). When the number N1 of sign inversions is equal to the number N2 of sign inversions (N in S56), either of the instructed point data is selected on the basis of a predetermined selecting condition for instructed point data.

In the present embodiment, the "selecting condition for instructed point data" is previously set to select instructed point data where the amount of movement on the B-axis at the time of sign inversions is smaller. When the number of sign inversions is zero both in the first instructed point data and the second instructed point data, the setting is performed to select a predetermined one of the instructed point data (for example, the first instructed point data).

Therefore, when the first instructed point data satisfies the selecting condition for instructed point data (Y in S60), the NC program generating unit 140 generates an NC program so as to include the first instructed point data (S62). When the second instructed point data satisfies the selecting condition for instructed point data (N in S60), the NC program generating unit 140 generates an NC program so as to include the second instructed point data (S64).

Referring back to FIG. 8, the program output unit 126 outputs the NC program generated in the manner described above to the numerical controller 52 (S20).

The information processing device 100 has been described above on the basis of the embodiment.

In the present embodiment, each of the first instructed point data and the second instructed point data is calculated for all the blocks of the CL data and an NC program is generated so as to include one of the instructed point data in which the number of sign inversions in the positions about the rotation axis is smaller. Therefore, an unnecessary movement of the tool T is suppressed when the NC program is executed by the numerical controller 52. As a result, deterioration in the machined surface quality can be suppressed and good machining efficiency can be maintained. That is, according to the present embodiment, an NC program that can suppress increase in the machining time in the machine tool 1 or deterioration in the machined surface quality can be generated.

In the embodiment described above, the solution selecting condition is set in the information processing device 100 to select a solution where the amount of movement on the B-axis is smaller from two calculated solutions. In a modification, the solution selecting condition may be set to select a solution where the amount of movement on the C-axis is smaller. Alternatively, the solution selecting condition may be set to select a solution where the both movement amounts (the total movement amount) of the B-axis and the C-axis are smaller.

In the embodiment described above, the selecting condition for instructed point data is set to select instructed point data where the amount of movement on the B-axis at the time of sign inversions is smaller when the numbers of sign inversions in the positions about the rotation axis are same between the first instructed point data and the second instructed point data, in a modification, the selecting condition for instructed point data may be set to select instructed point data where the amount of movement on the C-axis at the time of sign inversions is smaller. Alternatively, the selecting condition for instructed point data may be set to select instructed point data where the both movement amounts (the total movement amount) on the B-axis and the C-axis at the time of sign inversions are smaller. Alternatively, the selecting condition for instructed point data may be set to select instructed point data where the movement amount on the B-axis is smaller in the whole instructed point data. Alternatively, the selecting condition for instructed point data may be set to select instructed point data where the movement amount on the C-axis is smaller in the whole instructed point data. Alternatively, the selecting condition for instructed point data may be set to select instructed point data where the both movement amounts (the total movement amount) on the B-axis and the C-axis are smaller in the whole instructed point data. Alternatively, a user may set which one of the first instructed point data and the second instructed point data is to be selected in advance.

In the embodiment described above, an example in which the information processing device 100 generates the first instructed point data and the second instructed point data, selects instructed point data in which the number of sign inversions of the positions about the rotation axis is smaller, and then generates an NC program is presented. In a modification, the information processing device 100 may generate an NC program (a first NC program) including the first instructed point data and an NC program (a second NC program) including the second instructed point data, then select an NC program in which the number of sign inversions in execution of all blocks is smaller, and transmit the selected NC program to the numerical controller 52.

In the embodiment described above, an example in which the first instructed point data calculated with the initial values of the positions about the rotation axes being set at positive values (the first values) with respect to the reference positions, and the second instructed point data calculated with the initial values of the positions about the rotation axes being set at negative values (the second values) with respect to the reference positions are generated as the instructed point data is presented. Specifically, "the first value" is a positive value with respect to an axial direction (the Z-axis negative direction) serving as the reference for the B-axis, and "the second value" is a negative value with respect to the axial direction (the Z-axis negative direction) serving as the reference for the B-axis. In a modification, the axial direction serving as the reference may be an X-axis direction (for example, the X-axis negative direction), and a positive value (the first value) and a negative value (the second value) may be determined by using the reference.

While the case in which the positions about the B-axis and the C-axis, which are rotation axes, have the same positive or negative sign as illustrated in FIGS. 7A and 7B has been described in the above embodiment, the signs of the positions may be set to be different from each other. In this case as well, when the sign with respect to the B-axis is inverted, the sign with respect to the C-axis is also inverted. Therefore, the computing process based on "the number of inversions" described above effectively functions. When the positive and negative signs with respect to the B-axis and the C-axis are different from each other, the processes described above may be performed on the basis of the sign with respect to one of the rotation axes (for example, the B-axis).

In the embodiment described above, the five-axis working machine is illustrated as an example of the machine tool. That is, an example in which the linear axes are composed of three axes including the X-axis, the i-axis, and the Z-axis and the rotation axes are composed of two axes including the B-axis and the C-axis is illustrated. In a modification, the rotation axes may be composed of an A-axis and the C-axis. Alternatively, the rotation axes may be composed of the A-axis and the B-axis. The machine tool may be a four-axis working machine and the rotation axis may be composed of one axis (for example, only the B-axis). The first instructed point data and the second instructed point data may be generated for the one axis and instructed point data in which the number of sign inversions of the position about the rotation axis is smaller may be selected.

In the embodiment described above, a configuration in which the tool is rotated around one (the B-axis) of the two rotation axes and the table is rotated around the other rotation axis (the C-axis) is illustrated as an example of the machining equipment 2. In a modification, two rotation axes may be provided on the side of the spindle. Alternatively, two rotation axes may be provided on the side of the table. For example, a configuration in which the table is supported by a first member to be rotatable around the C-axis, and the first member is supported by a second member to be rotatable around the A-axis or the B-axis may be adopted. When the second member has the A-axis, the second member may be supported to be movable in the Y-axis direction. When the second member has the B-axis, the second member may be supported to be movable in the X-axis direction.

While an example in which the CAD device and the CAM device are separately configured is illustrated in the above embodiment, a CAD/CAM device including both the CAD function and the CAM function may be configured.

Although not mentioned in the above embodiment, the information processing program described above may be recorded in a computer readable recording medium to be provided.

The present invention is not limited to the above described embodiment or the modifications thereof, and may be embodied while modifying the components without departing from the scope of the invention. Various inventions may be formed by appropriately combining plural components disclosed in the above described embodiment and the modifications thereof. Further, several components may be omitted from the entire components described in the above described embodiment and the modifications thereof.

This application claims priority from Japanese Patent Application No. 2021-094982 filed on Jun. 7, 2021, the entire contents of which are hereby incorporated by reference herein.

The invention claimed is:

1. An information processing device that generates a Numerical Control (NC) program to be used in a machine tool having a linear axis and a rotation axis, the device comprising:

a processor including a Numerical Control (NC) program generating unit and a Cutter Location (CL) data acquiring unit; and a memory storing various programs and data, wherein CL data acquiring unit for acquiring CL data including an instructed position of a tool leading end point and an instructed angle of a tool posture; and the NC program generating unit for calculating a movement position on the linear axis corresponding to the instructed position and a rotational position about the rotation axis corresponding to the instructed angle on a basis of the acquired CL data to generate the NC program, wherein the NC program generating unit generates (i) first instructed point data calculated with an initial value of the rotational position and (ii) second instructed point data, which is different from the first instructed point data, calculated with the initial value of the rotational position, and the NC program generating unit counts number of inversions of the rotational position for each of the first instructed point data and the second instructed point data and generates the NC program in which the number of inversions is smaller, wherein based on the NC program generated by the NC program generating unit, control signals are transmitted by a numerical controller of the machine tool; and a machining equipment machines a workpiece in accordance with the control signals transmitted from the numerical controller, thereby suppressing an increase in a machining time and deterioration in a machined surface quality.

2. The information processing device according to claim 1, wherein the machine tool includes, as the rotation axis, a first rotation axis around which a tilt angle of a tool with respect to a workpiece is changed and a second rotation axis around which the workpiece is rotated, and the NC program generating unit counts number of inversions of a rotational position about the first rotation axis as the number of inversions.

3. The information processing device according to claim 1, wherein when the numbers of inversions with the first instructed point data and the second instructed point data are equal to each other, the NC program generating unit selects one of the first instructed point data and the second instructed point data on a basis of a predetermined selecting condition, and generates the NC program including the selected first or second instructed point data.

4. A non-transitory computer readable medium containing an information processing program, which is executed by a processor of an information processing device for generating a Numerical Control (NC) program to be used in a machine tool having a linear axis and a rotation axis, the computer-executable instructions executed by the processor comprising:

a function of acquiring Cutter Location (CL) data including an instructed position of a tool leading end point and an instructed angle of a tool posture; and a function of generating the NC program by calculating a movement position on the linear axis corresponding to the instructed position and a rotational position about the rotation axis corresponding to the instructed angle on a basis of the acquired CL data, wherein the function of generating the NC program includes:

generating (i) first instructed point data calculated with an initial value of the rotational position and (ii) second instructed point data, which is different from the first instructed point data, calculated with the initial value of the rotational position; and counting number of inversions of the rotational position for each of the first instructed point data and the second instructed point data and generating the NC program in which the number of inversions is smaller, wherein based on the NC program generated by the function of generating the NC program, control signals are transmitted by a numerical controller of the machine tool; and a machining equipment machines a workpiece in accordance with the control signals transmitted from the numerical controller, thereby suppressing an increase in a machining time and deterioration in a machined surface quality.

* * * * *